(12) United States Patent
Cornell et al.

(10) Patent No.: US 11,654,484 B2
(45) Date of Patent: May 23, 2023

(54) METHOD FOR MANUFACTURING BINDER JET PARTS

(71) Applicant: Ford Global Technologies, LLC, Dearborn, MI (US)

(72) Inventors: John Cornell, Allenton, MI (US); Mark Meinhart, Dexter, MI (US); Jason Powell, Ypsilanti, MI (US); Wolfram Buschhaus, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 17/060,231

(22) Filed: Oct. 1, 2020

(65) Prior Publication Data

US 2022/0105563 A1 Apr. 7, 2022

(51) Int. Cl.
*B22F 3/10* (2006.01)
*B22F 1/10* (2022.01)
*B33Y 10/00* (2015.01)

(52) U.S. Cl.
CPC .............. *B22F 3/1021* (2013.01); *B22F 1/10* (2022.01); *B33Y 10/00* (2014.12)

(58) Field of Classification Search
CPC ........... B22F 3/1021; B22F 1/10; B33Y 10/00
See application file for complete search history.

(56) References Cited

U.S. PATENT DOCUMENTS

| 9,815,118 B1* | 11/2017 | Schmitt ..................... B22F 7/02 |
| 2014/0031967 A1 | 1/2014 | Unger et al. |
| 2018/0001384 A1 | 1/2018 | Manteiga et al. |
| 2019/0337056 A1* | 11/2019 | El Naga ................. B22F 10/20 |

FOREIGN PATENT DOCUMENTS

| CN | 208619176 | 3/2019 |
| DE | 102010046579 | 3/2012 |

OTHER PUBLICATIONS

Wang et al. ("Investigation of sintering shrinkage in binder jetting additive manufacturing process." Procedia Manufacturing 10 (2017): 779-790.). (Year: 2017).*

* cited by examiner

*Primary Examiner* — Anthony J Zimmer
*Assistant Examiner* — Ricardo D Morales
(74) *Attorney, Agent, or Firm* — Burris Law, PLLC

(57) ABSTRACT

A method of forming a part includes metal binder jet printing a first green component with a first attachment interface, de-powdering the first green component, assembling the first green component with a second component comprising a second attachment interface and forming an assembly such that the first attachment interface and the second attachment interface are adjacent to each other. The assembly is sintered such that volumetric shrinkage of at least the first green component creates a compressive force across the first attachment interface and the second attachment interface, and the compressive force across the first attachment interface and the second attachment interface and heat from the sintering results in a metallurgical bond across the first attachment interface and the second attachment interface such that a monolithic part is formed.

20 Claims, 10 Drawing Sheets

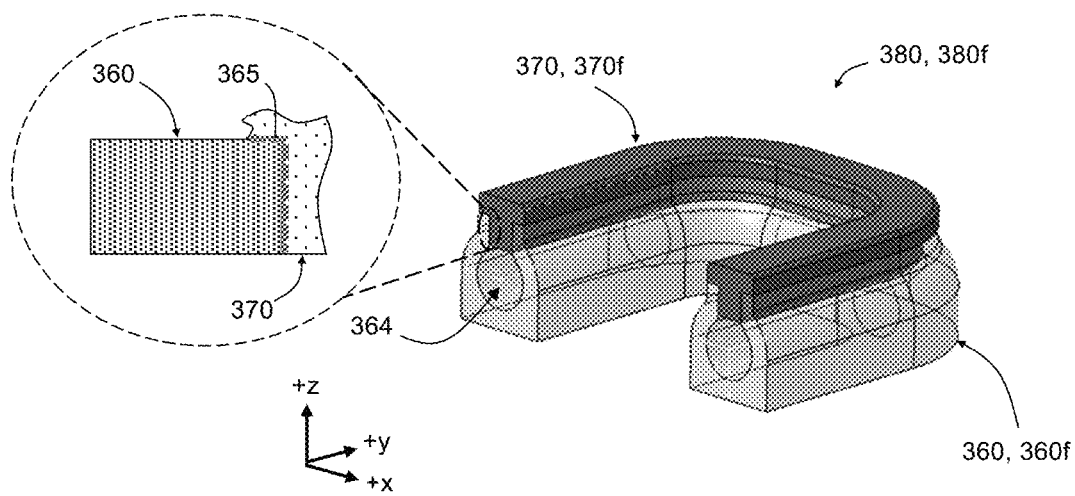
FIG. 10B
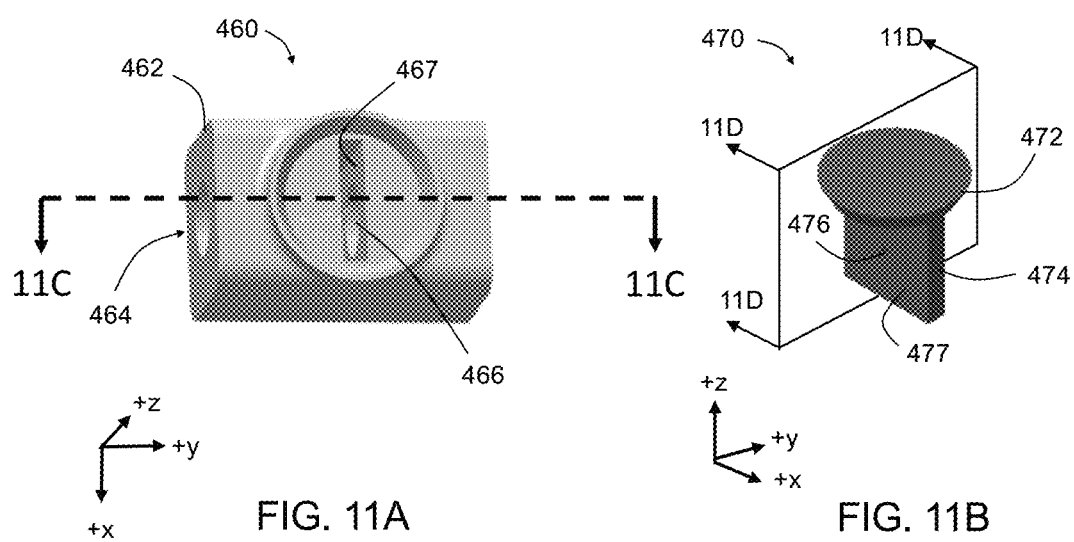
FIG. 11A
FIG. 11B

METHOD FOR MANUFACTURING BINDER JET PARTS

FIELD

The present disclosure relates to additive manufacturing parts and particularly to metal binder jetting parts.

BACKGROUND

The statements in this section merely provide background information related to the present disclosure and may not constitute prior art.

Additively manufacturing components using metal or alloy powders to generate an end product is a popular option for making metallic parts. Techniques such as laser sintering, laser melting, electron beam melting and binder jetting are some methods of additive manufacturing such metallic parts and these techniques apply energy to metal or alloy powder to form a "solid" final component or part. The laser and electron beam methods impart the energy through varying focused beam methods, while the binder jet method requires the initial green part, i.e., the part remaining after printing, to be sintered to achieve the final material properties. In each of the powdered metal processing methods the "loose" powder that is included in the final part is removed from around the part as well as from inside any internal cavities. The removal of the "loose" powder is commonly referred to as de-powdering. However, de-powdering internal passageways formed in additively manufactured components before sintering can be problematic.

The present disclosure addresses the issues of de-powdering additive manufactured parts among other issues related to additive manufacturing parts.

SUMMARY

This section provides a general summary of the disclosure and is not a comprehensive disclosure of its full scope or all of its features.

In one form of the present disclosure, a method of forming a part includes metal binder jet (MBJ) printing a first green component with a first attachment interface, de-powdering the first green component, assembling the first green component with a second component comprising a second attachment interface and forming an assembly such that the first attachment interface and the second attachment interface are adjacent to each other. With the close proximity of the two adjacent components the assembly can be placed into a furnace and the outcome of the heat from sintering results in a metallurgical bond across the first attachment interface and the second attachment interface such that a monolithic part is formed. The assembly can also be sintered such that volumetric shrinkage of at least the first green component creates a compressive force across the first attachment interface and the second attachment interface, and the compressive force across the first attachment interface and the second attachment interface and heat from the sintering results in a metallurgical bond across the first attachment interface and the second attachment interface such that a monolithic part is formed.

In some variations, the first attachment interface is a surface of an aperture in a sidewall of the first green component and the second attachment interface is a surface of a plug positioned within the aperture when the first green component and the second component are assembled. In such variations the first green component is at least partially de-powdered through the aperture in the sidewall. And in at least one variation the plug closes and seals the aperture in the sidewall of the first green component.

In some variations, the first attachment interface is a surface of a slot in a sidewall of the first green component and the second attachment interface is a surface of plug positioned within the slot when the first green component and the second component are assembled. In such variations the plug closes and seals the slot in the sidewall of the first green component. In at least one variation, the first green component is an elongated component with an internal passageway extending along a length of the elongated component, the slot extends along the sidewall along the length of the elongated component, and the plug extends along the length of the elongated component within the slot. Also, the plug can be a T-shaped plug extending along the length of the elongated component within the slot.

In some variations, the first green component is an elongated component with an internal passageway extending along a length of the elongated component and the plug extends into the internal passageway transverse to the length of the elongated component. In at least one variation the plug includes a control orifice positioned in the internal passageway of the first green part when the first green component and the second component are assembled. Also, in some variations the sidewall incudes a first sidewall, a second sidewall space apart from the first sidewall with the internal passageway between the first sidewall and the second sidewall, and the slot extends through the first sidewall and partially through the second sidewall. In such variations the plug can extend through the first sidewall and be embedded within the second sidewall.

In some variations, the first green component is MBJ printed within a build box of an MBJ printing machine and the assembly is larger than the build box such that assembly will not fit and cannot be MBJ printed as a single green component in the build box. In such variations, the second component is a second green component and the first green component and the second green component are MBJ printed in the build box of the MBJ printing machine. In at least one variation the first green component and the second green component are MBJ printed in the build box of the MBJ printing machine during a single MBJ printing run.

In another form of the present disclosure, a method of forming a part includes metal binder jet (MBJ) printing a first green component with an aperture having a first attachment interface and a second green component in the form of a plug with a second attachment interface, de-powdering the first green component through the aperture, and assembling the first green component and the second green component and to form an assembly such that the first attachment interface and the second attachment interface are adjacent to each other. The assembly is sintered such that volumetric shrinkage of at least the first green component creates a compressive force across the first attachment interface and the second attachment interface, and the compressive force across the first attachment interface and the second attachment interface and heat from the sintering results in a metallurgical bond across the first attachment interface and the second attachment interface such that a monolithic part is formed.

In some variations, the first green component is a tube with a first closed end, a second closed end, and a sidewall with the aperture. In such variations the sidewall can include a first sidewall, a second sidewall space apart from the first sidewall, and the aperture extends through the first sidewall and partially through the second sidewall. Also, the plug can extend through the first sidewall and partially into the second sidewall.

In still another form of the present disclosure, a method of forming a part includes MBJ printing a first green component in the form of a tube with a slot having a first attachment interface and a second green component in the form of a plug with a second attachment interface, and de-powdering the first green component through the slot. The method also includes assembling the first green component and the second green component and forming an assembly such that the first attachment interface and the second attachment interface are adjacent to each other. The assembly is sintered such that volumetric shrinkage of at least the first green component creates a compressive force across the first attachment interface and the second attachment interface, and the compressive force across the first attachment interface and the second attachment interface and heat from the sintering results in a metallurgical bond across the first attachment interface and the second attachment interface such that a monolithic part is formed.

In some variations, the slot extends through a sidewall of the tube, the plug includes a control orifice, and the control orifice is positioned in the tube and configured to control flow of a fluid through the monolithic part.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 10B is a perspective view of an assembly of the first green component and the second component in FIG. 10A;

FIG. 11A is a perspective view of still another first green component according to the teachings of the present disclosure;

FIG. 11B is a perspective view of still another second component according to the teachings of the present disclosure;

Figure 1:
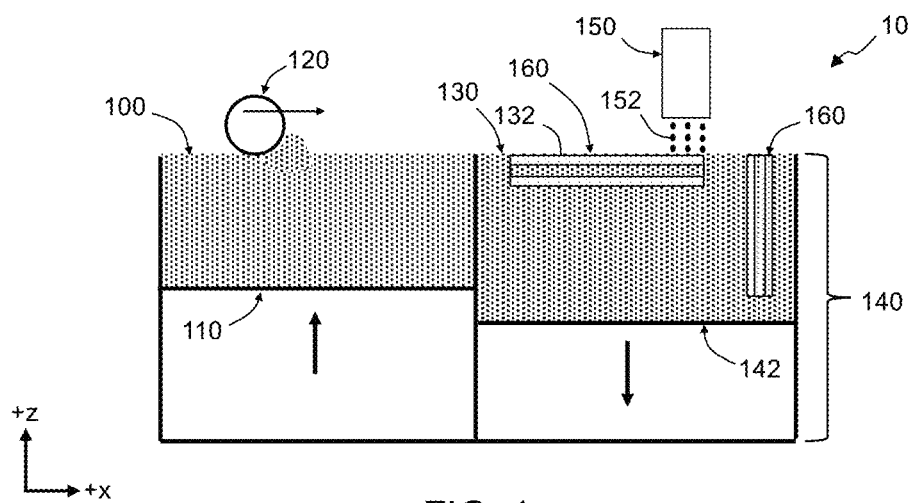
FIG. 1 shows a system for additively manufacturing parts by metal binder jetting (MBJ)

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a system 10 for additively manufacturing a first part 160 in a green state via binder jetting (e.g., metal binder jetting (MBJ)) is shown. The system 10 includes a first powder bed 100 on a first elevator platform 110 and a powder roller 120 configured to transfer powder from the first powder bed 100 to a second powder bed 130 on a second elevator platform 142 in a build box 140. A binder nozzle 150 (e.g., an inkjet print head) is included and configured to move and deposit a liquid binder 152 at desired or selected locations across an upper surface 132 of the powder bed 130. The desired or selected locations of the upper surface 132 with binder 152 form a layer (e.g., a first layer—not labeled) of the first part 160. As used herein the term or phrase "green state" or "green component" refers to a component that has been formed but is subjected to additional processing such as debinding and/or sintering before a final part is provided. Also, as used herein the term or phrase "final part" refers to a part with physical, chemical and/or mechanical properties suitable for the intended use of the par, though it is understood that the final part may be subjected to additional physical manipulation before being used such as machining, drilling, sanding, and coating, among others.

After the first layer is formed, the second elevator platform 142 moves downward (−z direction) and the powder roller 120 transfers powder from the first powder bed 100 to the second powder bed 130 and spreads a thin layer (not labeled) of powder across the previously formed first layer of the first part 160. Then the binder nozzle 150 moves across the powder bed 130 and deposits the binder 152 at desired or selected locations across the upper surface 132 of the powder bed 130 to form a second layer (not labeled) of the first part 160. This cycle, i.e., powder-binder-powder-binder, continues until the entire first part 160 is formed in a green state, layer by layer. The first part 160 is then removed from the build box 140 in the green state and subjected to additional processing. Non-limiting examples of powder materials include powders of nickel, nickel alloys, iron, iron alloys, stainless steel alloys, titanium, titanium alloys, copper, and copper alloys (e.g., brass) among others.

Figure 2A:
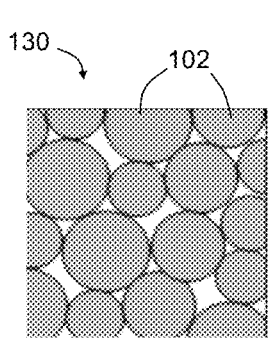
FIG. 2A shows powder particles used for binder jetting.
Figure 2B:
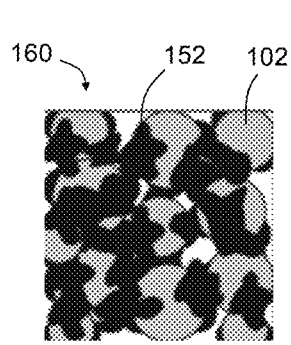
FIG. 2B shows a microstructure of a binder jet additive manufacture part in a green state.
Figure 2C:
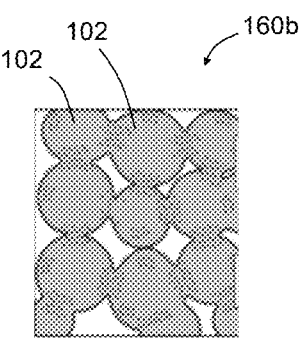
FIG. 2C shows a microstructure of a binder jet additive manufacture part after debinding.

Referring to FIGS. 2A-2E, FIG. 2A shows an enlarged view of powder particles 102 in the first powder bed 100 or the second powder bed 130, and FIGS. 2B-2E show an evolution of the microstructure for the first part 160 formed from the powder particles 102. Particularly, the microstructure of the first part 160 in the green state (FIG. 2B) includes powder particles 102 bound together with the binder 152. In some variations, the first part 160 in the green state is subjected to a debinding step or process (FIG. 2C) in which the binder 152 is removed by heat, i.e., the binder 152 is removed by vaporization and/or burning such that a "brown part" 160b is provided. In addition, the debinding can result in diffusion and initial bonding between adjacent particles 102 as shown in FIG. 2C. However, it should be understood that a part in a "brown state" is subjected to additional processing such as sintering before a final part is provided.

Figure 2D:
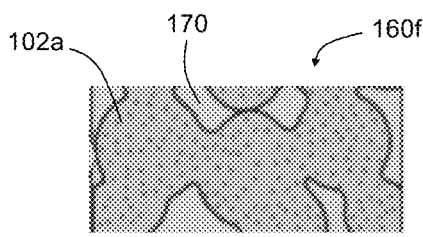
FIG. 2D shows a microstructure of a binder jet additive manufacture part after sintering with infiltration.
Figure 2E:
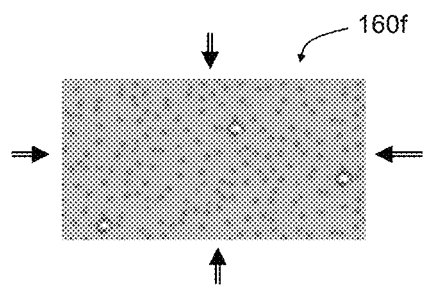
FIG. 2E shows a microstructure of a binder jet additive manufacture part after sintering.

Whether or not the first part 160 is subjected to debinding as shown in FIG. 2C, the first part 160 (or the brown part 160b) is sintered to form a final part 160f with a microstructure as shown in FIG. 2D or FIG. 2E. As used herein, the terms "sinter", "sintered" and/or "sintering" refer to coalescing metal powder of a green component into a nonporous component by heating the green component to a desired temperature without melting the powder. Non-limiting examples of desired sintering temperatures include temperatures between about 600° C. and about 650° C. for sintering of aluminum or aluminum alloy powders, between about 875° C. and about 925° C. for sintering of bronze powders, and between about 1250° C. and about 1350° C. for sintering of stainless steel alloy powders.

In some variations, a filler or infiltrant 170 is used during sintering to fill voids between sintered particles 102a (FIG. 2D) and thereby increase the density and strength of the part 160f. Also, during sintering densification of the microstructure results in volumetric shrinkage of the first part 160 as indicated by the double-line arrows in FIG. 2E.

Figure 3A:
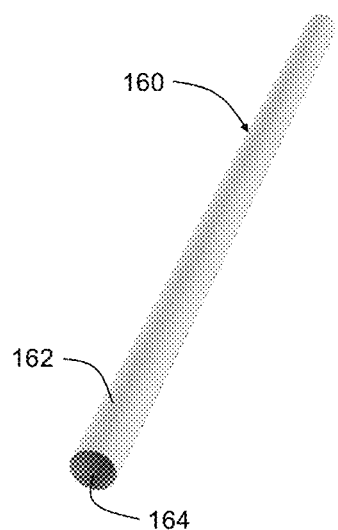
FIG. 3A is an example part formed by the system in FIG. 1.
Figure 3B:
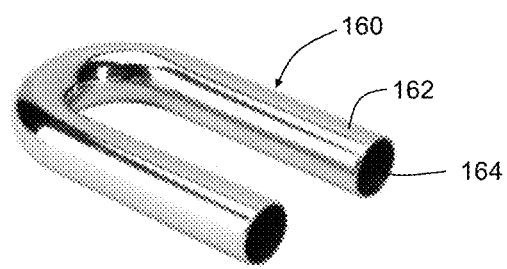
FIG. 3B is another example part formed by the system in FIG. 1.

While MBJ can be used to produce parts with interior spaces or chambers, de-powdering of such parts before sintering can be problematic. For example, and with reference to FIGS. 3A-3B, examples of the part 160 having an outer wall 162 (also referred to herein as a "sidewall") and an inner opening or internal passageway 164 are shown. While FIGS. 3A-3B show tube with at least one open end, it should be understood that MBJ can print or produce tubes with two closed ends. It should also be understood that removing powder from within the outer wall 162 of such parts 160 before the parts 160 are sintered can be difficult and time consuming. For example, the pre-sintered parts 160 do not have their desired post-sintering strength and the force required to remove powder from relatively long internal passageways can damage the green or brown parts 160, 160b. Accordingly, and as described below, the present disclosure provides methods for de-powdering and forming MBJ parts with relatively long internal passageways using de-powdering passageways formed in the parts and volumetric shrinkage to close and seal the de-powdering passageways during sintering. In addition, the present disclosure provides methods for using volumetric shrinkage to join parts to form a monolithic body that is too large to form in a build box of a MBJ printing system.

Figure 4:
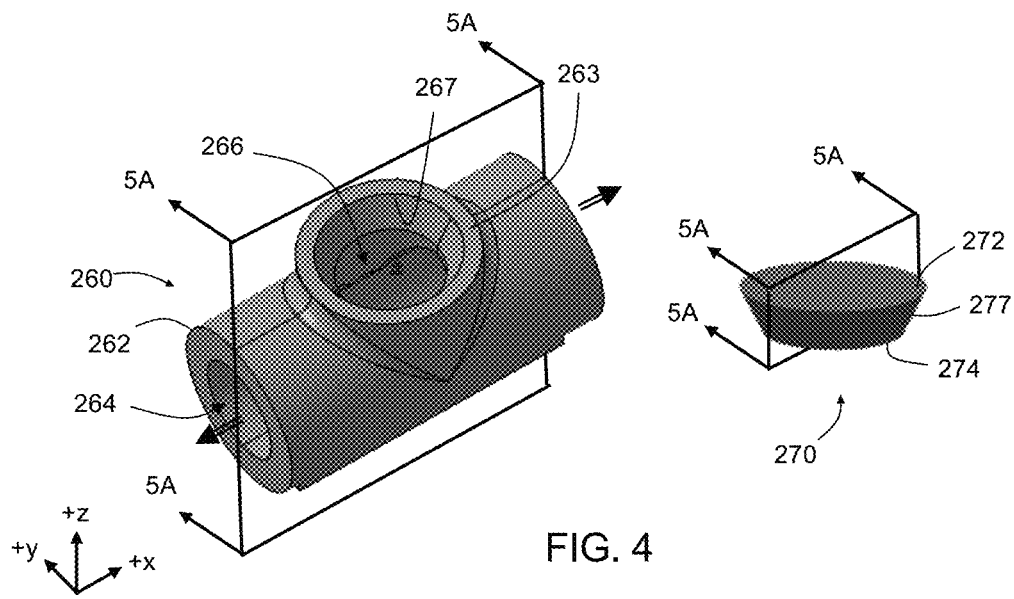
FIG. 4 is a perspective view of a first green component and a second component according to the teachings of the present disclosure.

Referring now to FIG. 4, a first green or brown component 260 (referred to herein simply as "first green component") and a second component 270 according to one form of the present disclosure are shown. The first green component 260 has an outer wall 262, an inner passageway 264, and a sidewall 263 defining a de-powder aperture 266 extending through the outer wall 262 and having a first attachment interface (surface) 267. The second component 270 has an upper (+z direction) surface 272, a lower surface 274, and a second attachment interface 277 extending between the upper surface 272 and the lower surface 274. Only a portion of a length of the first green component 260 is shown and the first green component 260 can extend further in the +x direction and −x direction as indicated by the double line arrows. That is, it should be understood that the outer wall 262 of the first green component 260 extends along a length direction (x direction) such that de-powdering the first green component 260 without the de-powdering aperture 266 is difficult or not possible without damaging the first green component 260. Stated differently, but for the de-powder aperture 266, de-powdering of the first green component 260 would be prohibitive. However, the de-powdering aperture 266 provides enhanced access to and de-powdering of the inner passageway 264 after the first green component 260 has been removed from the powder bed 130.

Figure 5A:
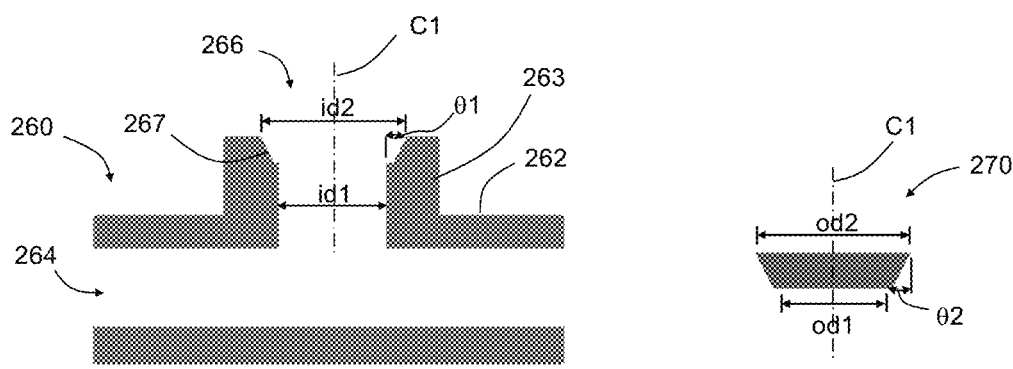
FIG. 5A is a cross sectional view of section 5A-5A in FIG. 4 before sintering.
Figure 5B:
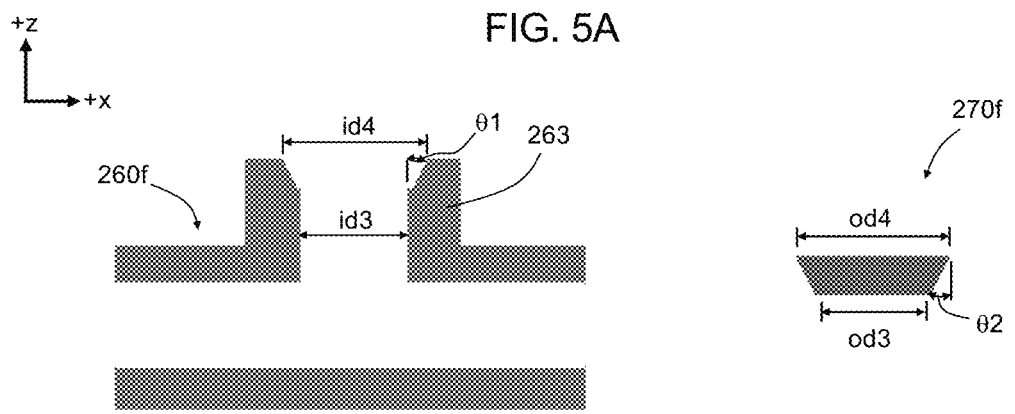
FIG. 5B is the cross sectional view in FIG. 5A after sintering the first green component and the second component.

Referring now to FIGS. 5A-5B, cross sectional views of section 5A-5A of the first green component 260 and the second component 270 before sintering are shown in FIG. 5A and the same views are shown after sintering in FIG. 5B. As shown in FIG. 5A, the first attachment interface 267 of the first green component 260 has a first inner dimension 'id1' (e.g., an inner diameter), a second inner dimension 'id2', and an angle 'θ1' relative to a central axis 'C1' of the de-powder aperture 266. Also, the second component 270 has a first outer dimension 'od1' (e.g., an outer diameter), a second outer dimension 'od2', and an angle 'θ2' relative to a central axis 'C2' of the second component 270. In some variations the angle θ2 is generally equal to the angle θ1.

Referring particularly to FIG. 5B, sintering of the first green component 260 results in volumetric shrinkage such that a first component 260f with the first attachment interface 267 has a first inner dimension 'id3' less than id1 (id3<id1) and a second inner dimension 'id4' less than id2 (id4<id2). Also, the second component 270 has a first outer dimension 'od3' and a second outer dimension 'od4'. In some variations the volumetric shrinkage is up to 30%, for example between 10% and 25%.

In at least one variation, the second component 270 (and other second components disclosed herein) is a second green component. In such variations, a second final component 270f is formed and the first outer dimension od3 is less than od1 (od3<od1) and the second outer dimension od4 is less than od2 (od4<od2). In other variations, the second component 270 (and other second components disclosed herein) is a pre-fabricated component that does not experience or experiences negligible volumetric shrinkage compared to the first green component 260 during sintering (i.e., od3=od1 and od4=od2). For example, the second component 270 can be an additive manufactured part that has already been sintered or a component made from a casting or wrought metal material. In still other variations, the second component 270 (and other second components disclosed herein) is an additive manufactured part that has not been sintered but is made from a material that does not exhibit as much volumetric shrinkage as the first green component 260.

Figure 6A:
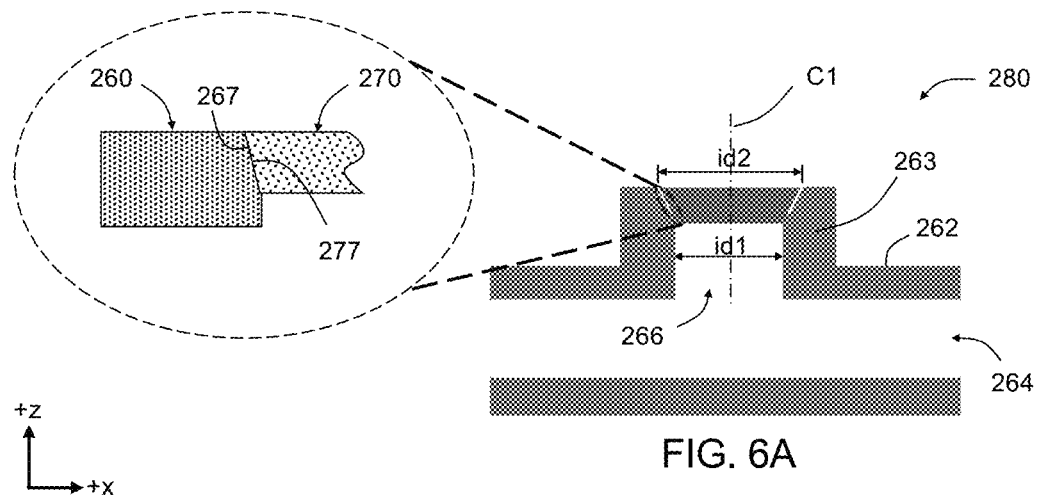
FIG. 6A is a cross sectional view of the first green component and the second component in FIG. 4 assembled together before sintering.
Figure 6B:
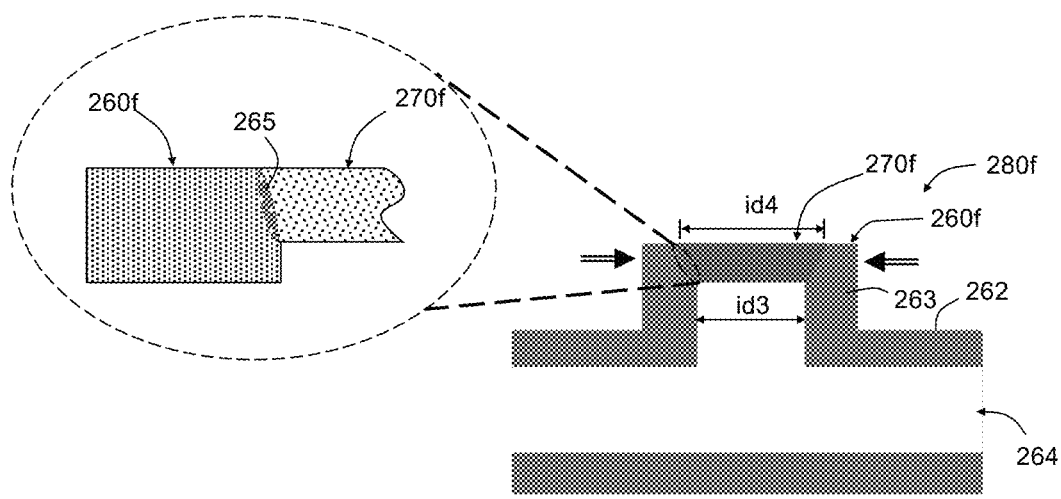
FIG. 6B is a cross sectional view of the first green component and the second component assembled together in FIG. 6A after sintering.
Figure 7:
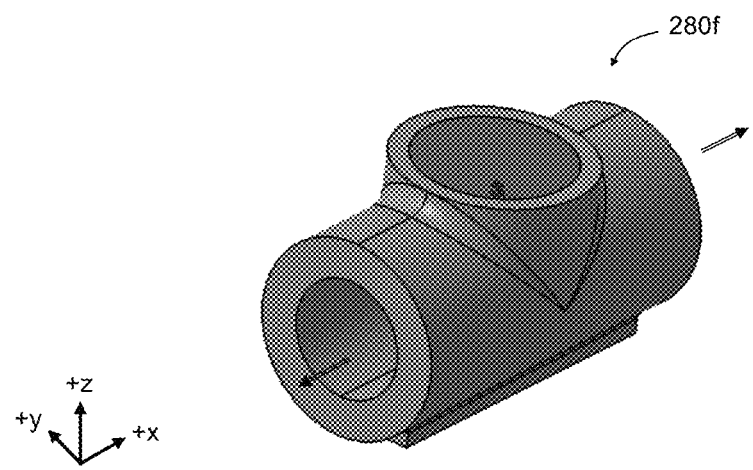
FIG. 7 is a perspective view of an assembly of the first green component and the second component in FIG. 4 after sintering.

Referring to FIGS. 6A-6B, sintering and the resulting volumetric shrinkage securing the second component 270 to the first green component 260 is shown. Particularly, FIG. 6A shows an assembly 280 formed from the second component 270 placed within the de-powder aperture 266 of the first green component 260. As shown in the enlarged circled region in FIG. 6A, the first attachment interface 267 and the second attachment interface 277 are still present. That is, the first attachment interface 267 and the second attachment interface 277 may or may not be in contact with each other, but no metallurgical bonding between or across the two attachment interfaces 267, 277 has occurred. However, and as discussed above, sintering of the assembly 280 results in volumetric shrinkage of the first green component 260 such that the de-powder aperture 266 of the first final component 260f has or desires to have the inner dimensions id3 and id4. That is, volumetric shrinkage of the first green component 260 results in the sidewall 263 moving towards the central axis C1 such that a compressive force is created across the first attachment interface 267 of the de-powder aperture 266 and the second attachment interface 277 of the second component 270. And in combination with heat from the sintering process, diffusion occurs across the first and second attachment interfaces 267, 277 such that a metallurgical bond 265 is formed between the first and second final components 260f, 270f as shown in the inset of FIG. 6B. It should be understood that the metallurgical bond 265 formed between the first final component 260f and the second final component 270f results in the final assembly 280f shown in FIG. 7 being a monolithic part. As used herein, the phrase "metallurgical bond" and "metallurgical bonding" refers to a chemical bond between two interfaces in contrast to a mechanical bond between two interfaces.

Figure 8:
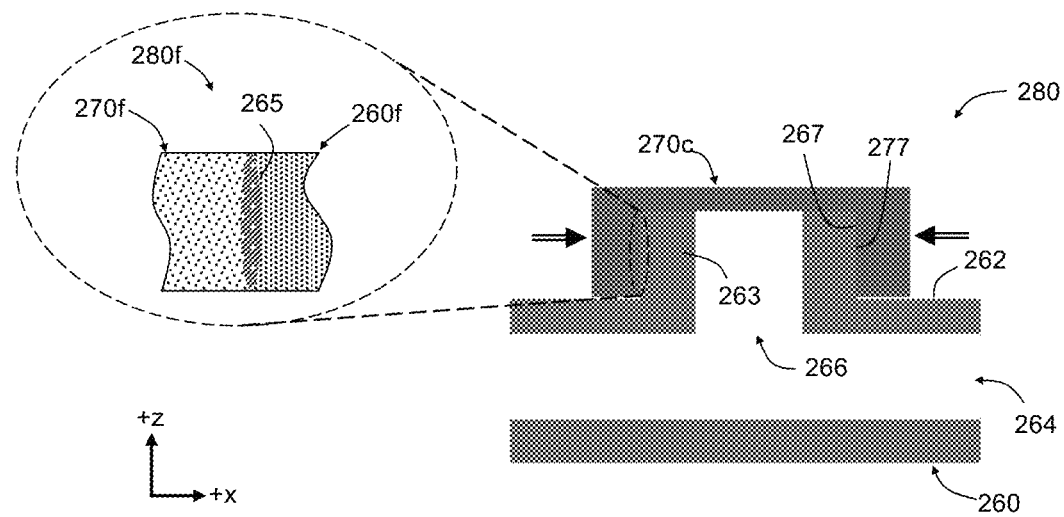
FIG. 8 is a cross sectional view of the first green component in FIG. 4 and a second green component in the form of a cap.
Figure 9:
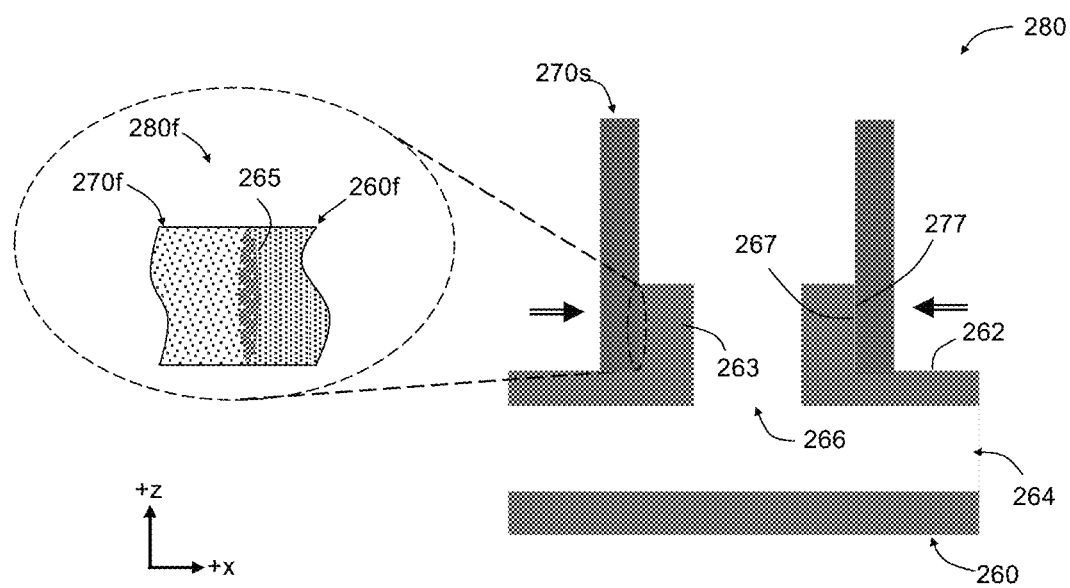
FIG. 9 is a cross sectional view of the first green component in FIG. 4 and a second green component in the form of a sleeve.

While FIGS. 4-7 show the second component 270 in the form of a plug that is placed within the de-powder aperture 266, it should be understood that the second component 270 can be in the form of a cap or sleeve that is placed around or outside of the sidewall 263. For example, and with reference to FIGS. 8 and 9, the second component 270 is in the form of a green cap 270c placed onto or over the de-powder aperture 266 is shown in FIG. 8 and the second component 270 in the form of a green sleeve 270s placed onto or over the de-powder aperture 266 is shown in FIG. 9. And similar to the metallurgical bonding of the first green component 260 to the second component 270 described above in FIGS. 4-7, sintering of the assembly 280 results in volumetric shrinkage of the second green component 270 such that a compressive force is created across the first attachment interface 267 of the de-powder aperture 266 and the second attachment interface 277 of the green cap 270 and green sleeve 270s. Accordingly, the compressive force in combination with heat from the sintering process results in diffusion across the first and second attachment interfaces 267, 277 such that and a metallurgical bond 265 is formed between the first and second final components 260f, 270f as shown in the circled regions in FIGS. 8 and 9. It should be understood that the metallurgical bond 265 formed between the first final component 260f and the second final component 270f results in the final assemblies 280f shown in FIGS. 8 and 9 being monolithic parts. It should also be understood that while FIGS. 4-9 depicted the second components 270, 270c, 270s as have a circular cross section in the x-y plane shown in the figures, in some variations the second components 270, 270c, 270s have non-circular cross-sections in the x-y plane. Non-limiting examples of non-circular cross sections include cross sections having a square shape, a rectangular shape, a pentagon shape, and a hexagon shape, among others.

Figure 10A:
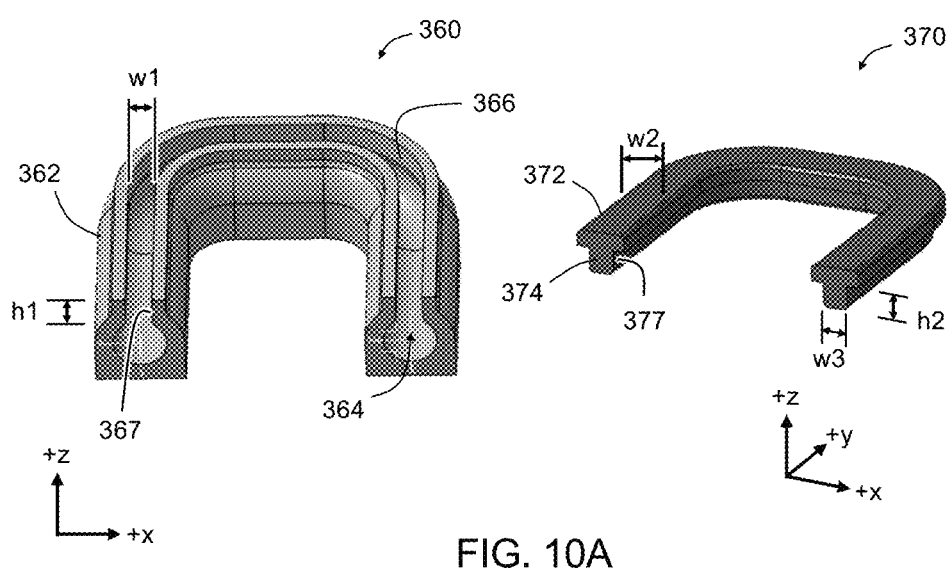
FIG. 10A is a perspective view of another first green component and another second component according to the teachings of the present disclosure.

Referring now to FIGS. 10A-10B, a first green component 360 and a second component 370 according to another form of the present disclosure are shown. The first green component 360 has an outer wall 362 defining an inner passageway 364 and a slot 366. As used herein the term "slot" refers to an opening in an outer wall or sidewall with a length to width aspect ratio not equal to 1.0. The slot 366 extends through the outer wall 362 and has a first attachment interface 367, a width dimension 'w1' and a height dimension 'h1'. The second component 370 is a plug (e.g., a T-shaped plug) with an upper (+z direction) portion 372 dimensioned to extend across (x direction) the slot 366 of the first green component 360 and a lower portion 374 dimensioned to extend or be disposed within the slot 366. Particularly, the upper portion has a width dimension 'w2' greater than w1 and the lower portion 374 has a width dimension 'w3' less than w1. In addition, the lower portion 374 has a height dimension 'h2.' Accordingly, the second component 370 is dimensioned to fit within the slot 366 of the first green component 360 and form an assembly 380 as shown in FIG. 11B. The lower portion 374 has a second attachment interface 377, and similar to the metallurgical bonding of the first green component 260 to the second component 360 described above, sintering of the assembly 380 results in volumetric shrinkage of the first green component 360 such that a compressive force is created across the first attachment interface 367 of the slot 366 and the second attachment interface 377 of the second component 370. Accordingly, the compressive force in combination with heat from the sintering process results in diffusion across the first and second attachment interfaces 367, 377 such that and a metallurgical bond 365 is formed the first and second final components 360f, 370f as shown in the circled region in FIG. 11B. It should be understood that the metallurgical bond 365 formed between the first final component 360f and the second final component 370f results in the final assembly 380f shown in FIG. 10B being a monolithic part.

Figure 11C:
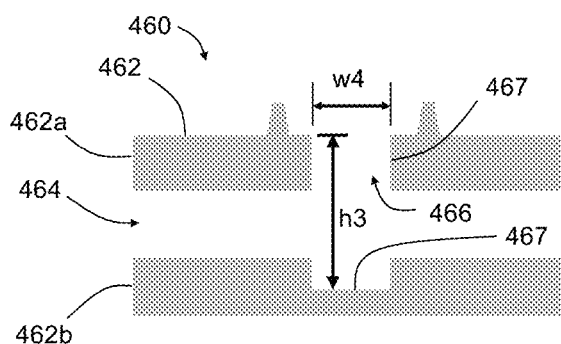
FIG. 11C is a cross sectional view of section 11C-11C in FIG. 11A.

Referring now to FIGS. 11A-11F, a first green component 460 and a second component 470 according to another form of the present disclosure are shown. The first green component 460 has an outer wall 462 defining an inner passageway 464 and a slot 466. The slot extends through the outer wall 462 and has a first attachment interface 467. The slot 466 has a width dimension 'w4' (FIG. 11C) and a height dimension 'h3'. As shown in FIG. 11C, in some variations the outer wall 462 has a first sidewall 462a and a second sidewall 462b spaced apart from the first sidewall 462a and the inner passageway 464 is between the first sidewall 462a and the second sidewall 462b. In such variations the slot 466 can extend through the first sidewall 462a and partially through or into the second sidewall 462b. It should be understood that such a slot configuration provides additional attachment interface area and mechanical support for the second component 470 metallurgically bonded to a first component 260f as discussed below.

Figure 11D:
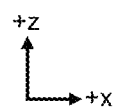
FIG. 11D is a cross sectional view of section 11D-11D in FIG. 11B.
Figure 11D:
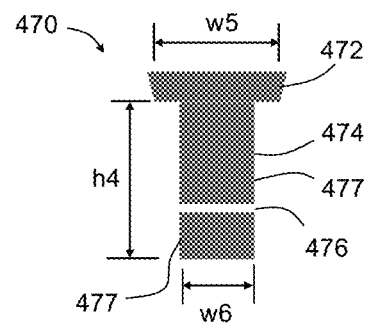
Figure 11E:
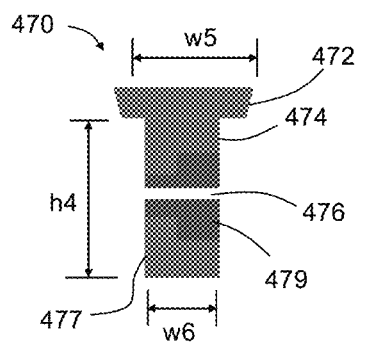
FIG. 11E is a cross-sectional view similar to FIG. 11D illustrating a second component similar to the second component of FIG. 11B but comprising an insert.

The second component 470 is a plug with an upper (+z direction) portion 472 dimensioned to extend across (x direction) the slot 466 of the first green component 460 and a lower portion 474 with a control orifice 476. In some variations the control orifice 476 is an aperture extending through the lower portion as shown in FIG. 11D. In other variations, an insert 479 includes the control orifice 476 and the insert 479 is disposed within the lower portion as shown in FIG. 11E. For example, the insert 479 can be formed from a material with enhanced erosion resistance compared to a material from which the second component 470 is formed. In the alternative, or in addition to, the insert 479 can be formed from a material that allows for the control orifice 476 to have a low or tight dimensional tolerance compared to the control orifice 476 formed in the lower portion 474. Non-limiting examples of the material from which the insert 479 is formed include ceramics such as alumina, zirconia, mullite, aluminum nitride, and titanium nitride, among others, and metallic materials such as steels, stainless steels, nickel-based alloys, and cobalt-based alloys, among others. It should be understood that the insert 479 can be added or attached to the second component 470 during sintering of a second green component 470, after sintering of a second green component 470, e.g., via a "press fit" or threaded engagement between the lower portion 474 and the insert 479, or using a press fit or threaded engagement between the insert 479 and a second component 470 made from a casting or wrought material.

Figure 11F:
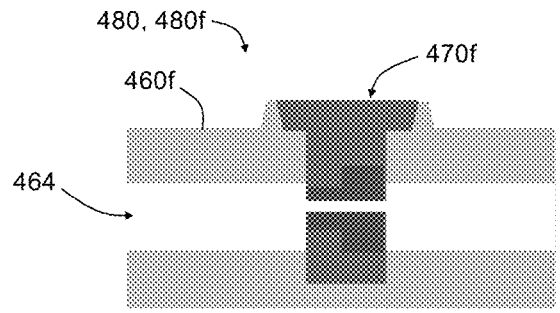
FIG. 11F is a cross-sectional view of an assembly of the first green component in FIG. 11A and the second component in FIG. 11E after sintering.

The upper portion 472 has an outer dimension 'w5' greater than w4 and the lower portion 474 has a width dimension 'w6' less than w4 and a height dimension 'h4' generally equal to h3. Accordingly, the second component 470 (i.e., the lower portion 472) is dimensioned to fit within the slot 466 of the first green component 460 and form an assembly 480 as shown in FIG. 11F. In addition, the lower portion 474 has a second attachment interface 477 and similar to the metallurgical bonding of the first green component 260 to the second component 360 described above, sintering of the assembly 480 results in volumetric shrinkage of the first green component 460 such that a compressive force is created across the first attachment interface 467 of the slot 466 and the second attachment interface 477 of the second component 470. Accordingly, the compressive force in combination with heat from the sintering process results in diffusion across the first and second attachment interfaces 467, 477 such that a metallurgical bond (not labeled) is formed the first and second final components 360f, 370f. It should be understood that the metallurgical bond results in the final assembly 480f shown in FIG. 11F being a monolithic part.

Figures 12A, 12B:
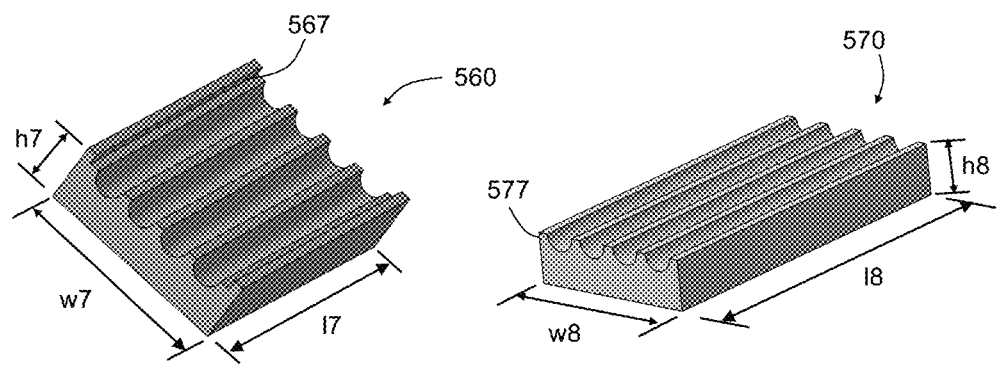
FIG. 12A is a perspective view of yet another first green component.
FIG. 12B is a perspective view of yet another second component.
Figure 12C:
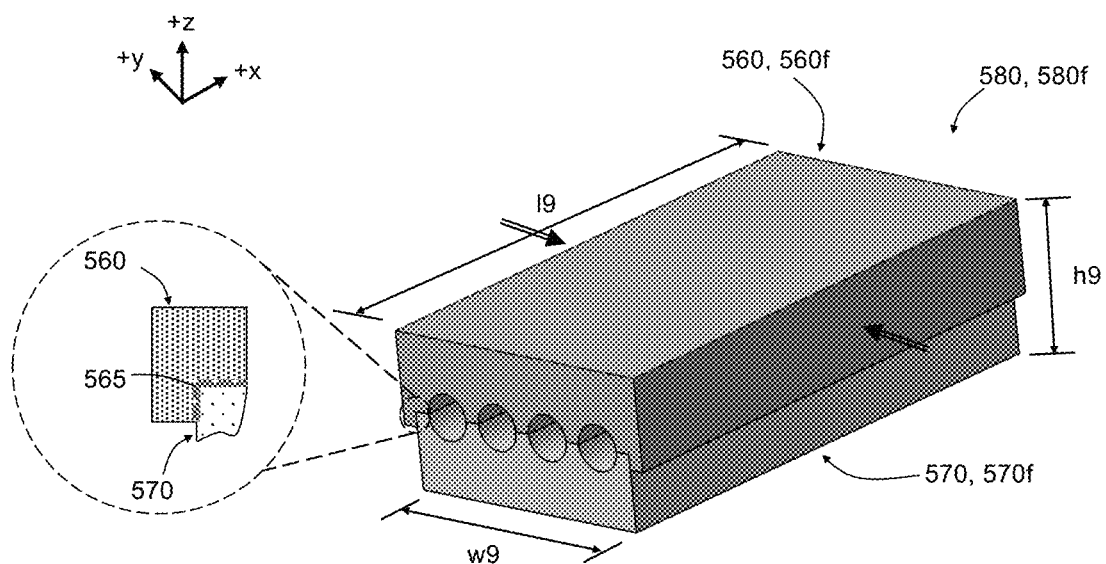
FIG. 12C is a perspective view of an assembly of the first green component in FIG. 12A and the second component in FIG. 12B after sintering.

Referring now to FIGS. 12A-12C, a first green component 560 and a second component 570 in a green state (i.e., a second green component 570) according to another form of the present disclosure are shown. The first green component 560 has a first attachment interface 567, a length 'l7', a width 'w7', and a height 'h7'. The second green component 570 has a second attachment interface 577, a length 'l8', a width 'w8', and a height 'h8'. As shown in FIG. 12C, the first green component 560 and the second green component 570 are configured to form an assembly 580 with a length 'l9', a width 'w9', and a height 'h9'. In addition, the first attachment interface 567 is adjacent to and in contact with the second attachment interface 577 when the assembly 580 is formed. And similar to the metallurgical bonding of the first green component 260 to the second component 360 described above, sintering of the assembly 580 results in volumetric shrinkage of the first green component 560 such that a compressive force is created across the first attachment interface 567 and the second attachment interface 577 of the second component 570. It should be understood that in some variations the first green component 560 and the second green component 570 can be clamped together such that a compressive force is applied across the first and second attachment interfaces 567, 577, and other interfaces between the first and second green components 560, 570. And similar to the metallurgical bonding of the first green component 260 to the second component 270 described above, sintering of the assembly 580 results in volumetric shrinkage of the first green component 560 such that the first attachment interface 567 compresses against the second attachment interface 577 of the second component 570, and in combination with heat from the sintering process results in a metallurgical bond 565 between the first final component 560f and the second final component 570f as shown in circled region in FIG. 12C. That is, the metallurgical bond formed between the first final component 560f and the second final component 570f results in the final assembly 580f shown in FIG. 12C being a monolithic part. Also, in variations where the first green component 560 and the second green component 570 are clamped together, a metallurgical bond 565 is between other interfaces between the first and second final components 560f, 570f.

In addition, the size of the first green component 560, i.e., the length, width, and height, allow for the first green component 560 to MBJ printed within the build box 140 of the system 10 (FIG. 1), and the size of the second green component 570, i.e., the length, width, and height, allow for the second green component 570 to MBJ printed within the build box 140 of the system 10. However, the size of the assembly 580 prevents printing the final assembly 580f (i.e., the monolithic part) in the build box 140. Stated differently, the size of the assembly 580 is too large to be MBJ printed within the build box 140. Accordingly, printing the assembly 580 in two or more separate components followed by joining the two or more components via volumetric shrinkage during sintering according to the teachings of the present disclosure allows for increased use of a given build box and corresponding MBJ printing system such that large monolithic parts can be formed in a given MBJ printing system without capital investment (or a delay in capital investment) in a larger MBJ printing system.

Figure 13:
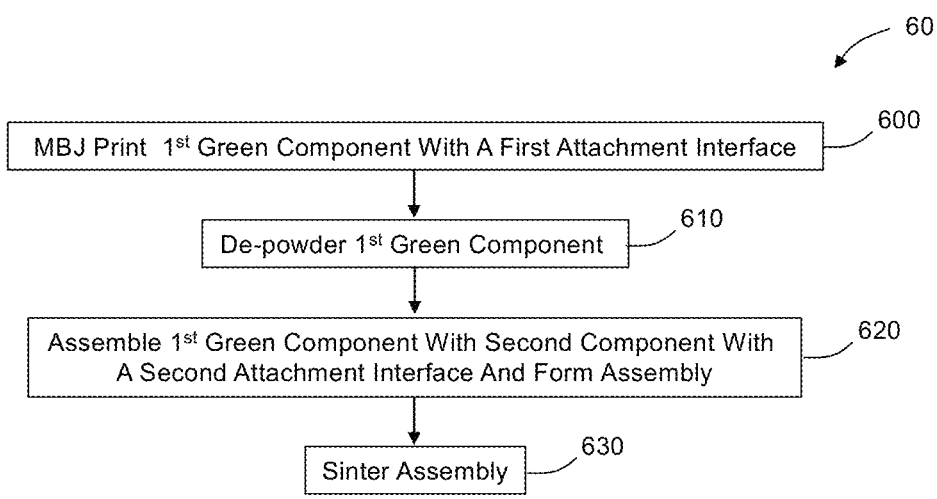
FIG. 13 is a flowchart of a method according to the teachings of the present disclosure.

Referring to FIG. 13, a method 60 for forming monolithic parts using at least one additive manufactured component is shown. The method 60 includes MBJ printing a first green component with a first attachment interface at 600 and de-powdering the first green component at 610. The first green component is assembled with a second component having a second attachment interface to form an assembly at 620. The assembly is sintered at 630 and volumetric shrinkage of the first green component creates a compressive force across the first attachment interface and the second attachment interface, and in combination with heat during the sintering, the first attachment interface and the second attachment interface metallurgically bond with each other such that a monolithic part is formed.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming a part, the method comprising:
   metal binder jet (MBJ) printing a first green component with a first attachment interface;
   de-powdering the first green component;
   assembling the first green component with a second component comprising a second attachment interface and forming an assembly such that the first attachment interface and the second attachment interface are adjacent to each other; and
   sintering the assembly such that volumetric shrinkage of at least the first green component creates a compressive force across the first attachment interface and the second attachment interface,
   wherein the compressive force across the first attachment interface and the second attachment interface and heat from the sintering diffuses material across the first attachment interface and the second attachment interface to form a metallurgical bond across the first attachment interface and the second attachment interface such that a monolithic part is formed.

2. The method according to claim 1, wherein the first attachment interface comprises a surface of an aperture in a sidewall of the first green component and the second attachment interface comprises a surface of a plug positioned within the aperture when the first green component and the second component are assembled.

3. The method according to claim 2, wherein the first green component is at least partially de-powdered through the aperture in the sidewall.

4. The method according to claim 3, wherein the plug closes and seals the aperture in the sidewall of the first green component.

5. The method according to claim 1, wherein the first attachment interface comprises a surface of a slot in a sidewall of the first green component, the second component is a plug, and the second attachment interface comprises a surface of the plug positioned within the slot when the first green component and the second component are assembled.

6. The method according to claim 5, wherein the plug closes and seals the slot in the sidewall of the first green component.

7. The method according to claim 6, wherein the first green component is an elongated component with an internal passageway extending along a length of the elongated component, the slot extends along the sidewall along the length of the elongated component, and the plug extends along the length of the elongated component within the slot.

8. The method according to claim 7, wherein the plug is a T-shaped plug extending along the length of the elongated component within the slot.

9. The method according to claim 6, wherein the first green component is an elongated component with an internal passageway extending along a length of the elongated component, and the plug extends into the internal passageway transverse to the length of the elongated component.

10. The method according to claim 9, wherein the plug comprises a control orifice positioned in the internal passageway of the first green component when the first green component and the second component are assembled.

11. The method according to claim 10, wherein the plug comprises an insert made from a material different than the plug, the insert having the control orifice positioned in the internal passageway of the first green component when the first green component and the second component are assembled.

12. The method according to claim 9, wherein the sidewall comprises a first sidewall and a second sidewall space apart from the first sidewall with the internal passageway between the first sidewall and the second sidewall, the slot extends through the first sidewall and partially through the second sidewall, and the plug extends through the first sidewall and is embedded within the second sidewall.

13. The method according to claim 1, wherein the first green component is MBJ printed within a build box of an MBJ printing machine and the assembly is larger than the build box such that assembly will not fit and cannot be MBJ printed as a single green component in the build box.

14. The method according to claim 13, wherein the second component is a second green component and the first green component and the second green component are MBJ printed in the build box of the MBJ printing machine.

15. The method according to claim 14, wherein the first green component and the second green component are MBJ printed in the build box of the MBJ printing machine during a single MBJ printing run.

16. A method for forming a part, the method comprising:
    metal binder jet (MBJ) printing a first green component comprising an aperture with a first attachment interface and a second green component comprising a plug with a second attachment interface;
    de-powdering the first green component through the aperture;
    assembling the first green component and the second green component and forming an assembly such that the first attachment interface and the second attachment interface are adjacent to each other; and
    sintering the assembly such that volumetric shrinkage of at least the first green component creates a compressive force across the first attachment interface and the second attachment interface, wherein the compressive force across the first attachment interface and the second attachment interface and heat from the sintering diffuses material across the first attachment interface and the second attachment interface to form a metallurgical bond across the first attachment interface and the second attachment interface such that a monolithic part is formed.

17. The method according to claim 16, wherein the first green component is a tube comprising a first closed end, a second closed end, and a sidewall with the aperture.

18. The method according to claim 17, wherein the sidewall comprises a first sidewall and a second sidewall space apart from the first sidewall, the aperture extends through the first sidewall and partially through the second sidewall, and the plug extends through the first sidewall and partially into the second sidewall.

19. A method of forming a part, the method comprising:
metal binder jet (MBJ) printing a first green component comprising a tube with a slot having a first attachment interface and a second green component comprising a plug with a second attachment interface;
de-powdering the first green component through the slot;
assembling the first green component and the second green component and forming an assembly such that the first attachment interface and the second attachment interface are adjacent to each other; and
sintering the assembly such that volumetric shrinkage of at least the first green component creates a compressive force across the first attachment interface and the second attachment interface,
wherein the compressive force across the first attachment interface and the second attachment interface and heat from the sintering diffuses material across the first attachment interface and the second attachment interface to form a metallurgical bond across the first attachment interface and the second attachment interface such that a monolithic part is formed.

20. The method according to claim 19, wherein the slot extends through a sidewall of the tube and the plug has a control orifice positioned in the internal passageway of the first green component when the first green component and the second component are assembled.

\* \* \* \* \*